United States Patent
Lee et al.

(10) Patent No.: US 11,283,062 B2
(45) Date of Patent: Mar. 22, 2022

(54) NEGATIVE ELECTRODE FOR LITHIUM SECONDARY BATTERY AND LITHIUM SECONDARY BATTERY COMPRISING SAME

(71) Applicant: LG CHEM, LTD., Seoul (KR)

(72) Inventors: Su-Min Lee, Daejeon (KR); Yong-Ju Lee, Daejeon (KR); Eun-Kyung Kim, Daejeon (KR); Sun-Young Shin, Daejeon (KR); Il-Geun Oh, Daejeon (KR); Rae-Hwan Jo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 289 days.

(21) Appl. No.: 16/787,535

(22) Filed: Feb. 11, 2020

(65) Prior Publication Data
US 2020/0176753 A1    Jun. 4, 2020

Related U.S. Application Data

(63) Continuation of application No. PCT/KR2018/009420, filed on Aug. 16, 2018.

(30) Foreign Application Priority Data

Aug. 18, 2017    (KR) .................. 10-2017-0105004

(51) Int. Cl.
*H01M 4/133*    (2010.01)
*H01M 4/36*    (2006.01)
(Continued)

(52) U.S. Cl.
CPC .......... *H01M 4/133* (2013.01); *H01M 4/366* (2013.01); *H01M 4/386* (2013.01); *H01M 4/587* (2013.01);
(Continued)

(58) Field of Classification Search
None
See application file for complete search history.

(56) References Cited

U.S. PATENT DOCUMENTS

2004/0175621 A1    9/2004    Iriyama et al.
2009/0301866 A1    12/2009    Zaghib et al.
(Continued)

FOREIGN PATENT DOCUMENTS

| CN | 105789556 A | 7/2016 |
|---|---|---|
| JP | 2006-196247 A | 7/2006 |

(Continued)

OTHER PUBLICATIONS

Machine Translation of JP2015069712 (Year: 2015).*
(Continued)

*Primary Examiner* — Wyatt P McConnell
(74) *Attorney, Agent, or Firm* — Birch, Stewart, Kolasch & Birch, LLP

(57) ABSTRACT

A negative electrode for a lithium secondary battery (and a lithium secondary battery including the same) including: a negative electrode current collector; a first negative electrode mixture layer present on at least one surface of the negative electrode current collector and including a first carbonaceous negative electrode active material, a first polymer binder and a first conductive material; a second negative electrode mixture layer present on a top surface of the first negative electrode mixture layer and including a silicon-based negative electrode active material, a second polymer binder and a second conductive material; and a third negative electrode mixture layer present on a top surface of the second negative electrode mixture layer and including a second carbonaceous negative electrode active material, a third polymer binder and a third conductive material.

10 Claims, 2 Drawing Sheets

(51) Int. Cl.
  *H01M 4/38*     (2006.01)
  *H01M 4/587*    (2010.01)
  *H01M 4/62*     (2006.01)
  *H01M 10/0525*  (2010.01)
  *H01M 4/02*     (2006.01)

(52) U.S. Cl.
  CPC ....... *H01M 4/622* (2013.01); *H01M 10/0525* (2013.01); *H01M 2004/021* (2013.01); *H01M 2004/027* (2013.01)

(56) References Cited

U.S. PATENT DOCUMENTS

| | | |
|---|---|---|
| 2014/0170484 A1 | 6/2014 | Fukahori |
| 2014/0363736 A1 | 12/2014 | Kim et al. |
| 2016/0204428 A1 | 7/2016 | Sugawara |
| 2017/0288216 A1 | 10/2017 | Kamo et al. |

FOREIGN PATENT DOCUMENTS

| | | | |
|---|---|---|---|
| JP | 2015-69712 A | | 4/2015 |
| JP | 2015069712 | * | 4/2015 |
| KR | 10-2008-0091499 A | | 10/2008 |
| KR | 10-1357885 B1 | | 2/2014 |
| KR | 10-2014-0079702 A | | 6/2014 |
| KR | 10-2014-0138079 A | | 12/2014 |
| KR | 10-2015-0118304 A | | 10/2015 |
| KR | 10-2016-0087121 A | | 7/2016 |
| KR | 10-2016-0122937 A | | 10/2016 |
| KR | 10-2017-0007140 A | | 1/2017 |
| KR | 10-2017-0057309 A | | 5/2017 |

OTHER PUBLICATIONS

"A Basic Guide to Particle Characterization," Malvern Instruments Worldwide—White Paper, May 2, 2012, 24 pages, XP055089322.
Chen et al., "Multi-scale study of thermal stability of lithiated graphite," Energy & Environmental Science, vol. 4, No. 10, 2011, pp. 4023-4030, XP055700306.
Extended European Search Report dated Jun. 15, 2020 for European Patent Application No. 18845787.3.
Nishida, "Development of Surface Modified Carbon Anode Material for High-Power Lithium-Ion Battery," Annual World Conference on Carbon 2009, Jun. 19, 2009, 2 pages, XP055700301.
"Annual World Conference on Carbon 2009," Biarritz, France, Jun. 14-19, 2009, vol. 1 of 4, 26 pages, XP055700302.
Sole et al., "The role of re-aggregation on the performance of electrochemically exfoliated many-layer graphene for Li-ion batteries," Journal of Electroanalytical Chemistry, Elsevier, vol. 753, May 15, 2015, pp. 1-7, XP029271053.
Deng et al., "Naturally Rolled-Up C/Si/C Trilayer Nanomembranes as Stable Anodes for Lithium-Ion Batteries with Remarkable Cycling Performance", Angewandte Chemie, vol. 125, 2013, pp. 2382-2386.
International Search Report issued in PCT/KR2018/009420 (PCT/ISA/210), dated Feb. 25, 2019.

* cited by examiner

FIG. 1
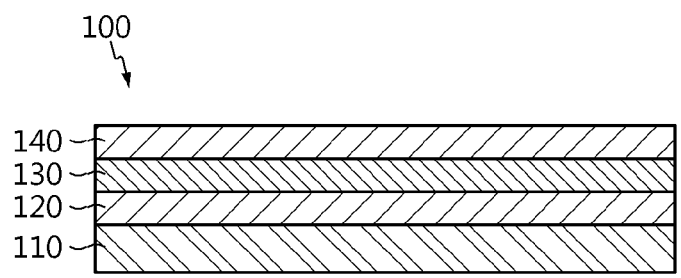
FIG. 2 – Conventional Art
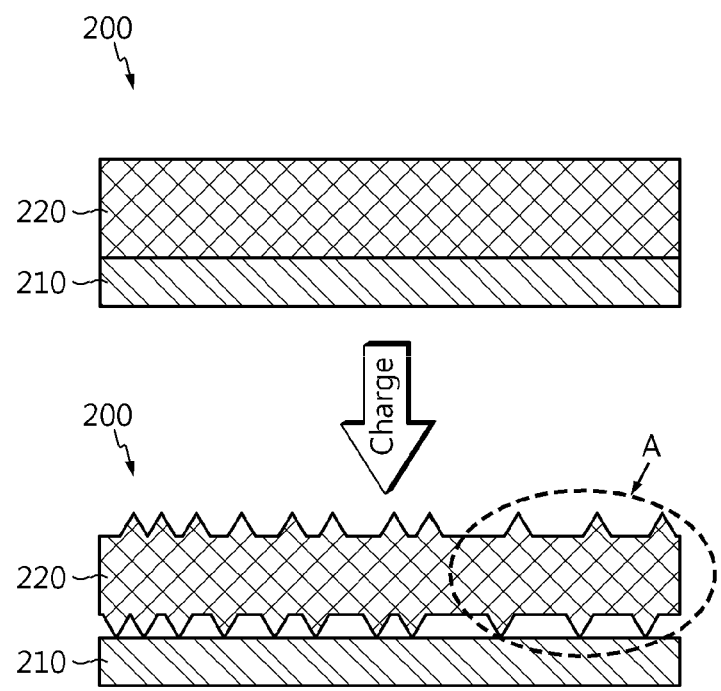

NEGATIVE ELECTRODE FOR LITHIUM SECONDARY BATTERY AND LITHIUM SECONDARY BATTERY COMPRISING SAME

CROSS-REFERENCE TO RELATED APPLICATIONS

This application is a By-Pass Continuation of International Application PCT/KR2018/009420, filed Aug. 16, 2018, which claims the benefit of Korean Patent Application No. 10-2017-0105004 filed on Aug. 18, 2017 in the Republic of Korea, the disclosures of which are incorporated herein in their entirety by reference.

TECHNICAL FIELD

The present disclosure relates to a negative electrode for a lithium secondary battery and a lithium secondary battery including the same.

BACKGROUND ART

As technological development and a demand for mobile instruments have increased, rechargeable secondary batteries have been increasingly in demand as energy sources. In addition, among such secondary batteries, lithium secondary batteries having high energy density and voltage, long cycle life and a low discharge rate have been commercialized and used widely. A lithium secondary battery includes a positive electrode, a negative electrode and a separator interposed between the positive electrode and the negative electrode. The electrodes, such as the positive electrode and the negative electrode, are obtained by coating an electrode current collector with slurry containing an electrode active material, binder and a solvent, followed by drying and pressing.

Lithium metal has been used as a negative electrode active material. However, when using lithium metal, a short-circuit occurs in a battery due to the formation of dendrite to cause a problem of explosion. Thus, instead of lithium metal, various types of carbonaceous materials capable of lithium intercalation/deintercalation and including artificial graphite, natural graphite or hard carbon have been used.

However, such carbonaceous materials are problematic in that they have low capacity in terms of energy density per unit volume of an electrode and easily cause side reaction with an organic electrolyte solution at a high discharge voltage, thereby causing serious problems of ignition and explosion due to the malfunction and overcharge of a battery.

Therefore, active studies have been conducted about a metallic negative electrode active material, such as silicon (Si). The Si metallic negative electrode active material is known to show a high lithium capacity of about 4200 mAh/g. However, before and after the reaction with lithium, i.e., during charge/discharge, it causes a change in volume of 300% or more. Due to this, the conductive network in an electrode is damaged and the contact resistance between particles is increased, resulting in degradation of the performance of a battery.

Therefore, there has been an attempt to develop an electrode whose silicon-based negative electrode active material has improved conductivity by using graphite-based particles surrounding the silicon negative electrode active material.

However, in the case of the above-mentioned negative electrode active material, a change in volume of up to 300% of the silicon-based negative electrode active material during charge/discharge causes degradation of contact between the graphite-based particles and the silicon-based particles, resulting in degradation of the performance of a battery undesirably. Particularly, in the case of a silicon-based negative electrode active material, a short-circuit between the silicon-based particles and the graphite-based particles becomes severe during charge/discharge, thereby causing a problem of degradation of the performance of a battery.

DISCLOSURE

Technical Problem

The present disclosure is directed to a negative electrode for a lithium secondary battery which is prevented from a separation phenomenon in the electrode caused by non-uniform swelling, and a lithium secondary battery including the same.

Technical Solution

In one aspect of the present disclosure, there is provided a negative electrode for a lithium secondary battery which includes: a negative electrode current collector; a first negative electrode mixture layer present on at least one surface of the negative electrode current collector and including a first carbonaceous negative electrode active material, a first polymer binder and a first conductive material; a second negative electrode mixture layer present on a top surface of the first negative electrode mixture layer and including a silicon-based negative electrode active material, a second polymer binder and a second conductive material; and a third negative electrode mixture layer present on a top surface of the second negative electrode mixture layer and including a second carbonaceous negative electrode active material, a third polymer binder and a third conductive material, wherein the first carbonaceous negative electrode active material includes spherical shaped particles, which spherical shaped particles having a sphericity of 0.90-0.99, said spherical shaped particles including an oxidized surface portion and/or carbon-coated surface portion, and the second carbonaceous negative electrode active material includes flake shaped particles having a sphericity of 0.70-0.89, said flake shaped particles including a carbon-coated surface portion.

The spherical shaped particles of the first carbonaceous negative electrode active material may have an average particle diameter of 3-25 µm.

The flake shaped particles of the second carbonaceous negative electrode active material may have a crystal size of 60-90 nm.

The spherical shaped particles of the first carbonaceous negative electrode active material may have a sphericity of 0.92-0.97 and the flake shaped particles of the second carbonaceous negative electrode active material may have a sphericity of 0.75-0.87.

The first negative electrode mixture layer may have a porosity which is 0.85-0.95 times of a porosity of the third negative electrode mixture layer.

The first carbonaceous negative electrode active material may include natural graphite and the second carbonaceous negative electrode active material may include artificial graphite.

The silicon-based negative electrode active material may be at least one selected from the group consisting of silicon and silicon oxides, wherein silicon dioxide are defined as SiOx, wherein 0<x<2.

Each of the first polymer binder, the second polymer binder and the third polymer binder may be independently at least one selected from the group consisting of polyvinylidene fluoride-co-hexafluoropropylene, polyvinylidene fluoride, polyacrylonitrile, polymethyl methacrylate, styrene-butadiene rubber and carboxymethyl cellulose.

Each of the first conductive material, the second conductive material and the third conductive material may be independently at least one selected from the group consisting of graphite, carbon black, conductive fibers, metal powder, conductive whisker, conductive metal oxide and a conductive polymer.

In another aspect of the present disclosure, there is also provided a lithium secondary battery including a positive electrode, a negative electrode and a separator interposed between the positive electrode and the negative electrode, wherein the negative electrode is the negative electrode described herein.

Advantageous Effects

According to an embodiment of the present disclosure, a tri-layer structure is introduced, and the tri-layer structure includes a negative electrode mixture layer containing a silicon-based negative electrode active material and further includes, on the upper layer and lower layer thereof, negative electrode active material layers including different types of carbonaceous negative electrode active materials having different spherical shapes and potentially different surface portions. Thus, it may be possible to prevent non-uniform volumetric swelling caused by the silicon-based negative electrode active material and a separation phenomenon in an electrode. As a result, it may be possible to significantly improve the adhesion between the negative electrode current collector and the negative electrode active material layer, and thus to provide significantly improved electrical characteristics, such as one or more of output characteristics and life characteristics.

DESCRIPTION OF DRAWINGS

FIG. 1 is a schematic sectional view illustrating the negative electrode for a lithium secondary battery according to an embodiment of the present disclosure.

FIG. 2 is a schematic view illustrating non-uniform swelling and electrode separation in a conventional negative electrode for a lithium secondary battery, during charge.

BEST MODE

Figure 3:
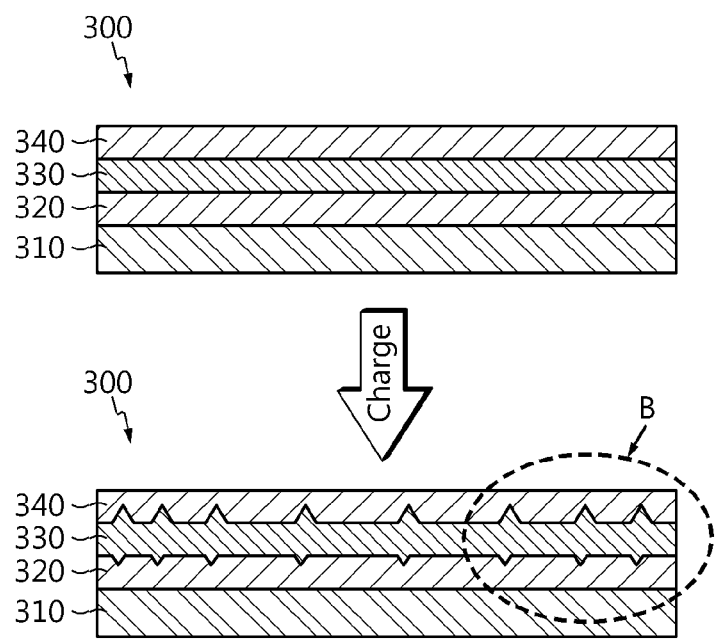
FIG. 3 is a schematic view illustrating inhibition of non-uniform swelling and electrode separation in the negative electrode for a lithium secondary battery according to an embodiment of the present disclosure, during charge.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect, there is provided a negative electrode for a lithium secondary battery which includes: a negative electrode current collector; a first negative electrode mixture layer present on at least one surface of the negative electrode current collector and including a first carbonaceous negative electrode active material, a first polymer binder and a first conductive material; a second negative electrode mixture layer present on a top surface of the first negative electrode mixture layer and including a silicon-based negative electrode active material, a second polymer binder and a second conductive material; and a third negative electrode mixture layer present on a top surface of the second negative electrode mixture layer and including a second carbonaceous negative electrode active material, a third polymer binder and a third conductive material, wherein the first carbonaceous negative electrode active material includes spherical shaped particles, which spherical shaped particles include an oxidized surface portion and/or carbon-coated surface portion, and the second carbonaceous negative electrode active material includes flake shaped particles, which flake shaped particles include a carbon-coated surface portion.

Referring to FIG. 1, the negative electrode 100 according to an embodiment of the present disclosure includes: a negative electrode current collector 110; a first negative electrode mixture layer 120 present on the top surface of the negative electrode current collector; a second negative electrode mixture layer 130 present on the top surface of the first negative electrode mixture layer 120; and a third negative electrode mixture layer 140 present on the top surface of the second negative electrode mixture layer 130.

The negative electrode according to an embodiment of the present disclosure is provided with a negative electrode mixture layer having three layers on the negative electrode current collector. The three negative electrode mixture layers have a mixture layer containing a silicon-based negative electrode active material at the center, and each of the top surface and the bottom surface of the mixture layer is provided with a different mixture layer containing a carbonaceous negative electrode active material having different characteristics.

Particularly, the first negative electrode mixture layer, which may be formed to directly face the negative electrode current collector, includes a first carbonaceous negative electrode active material, a first polymer binder and a first conductive material, the second negative electrode mixture layer present on a top surface of the first negative electrode mixture layer includes a silicon-based negative electrode active material, a second polymer binder and a second conductive material, and the third negative electrode mixture layer present on a top surface of the second negative electrode mixture layer includes a second carbonaceous negative electrode active material, a third polymer binder and a third conductive material.

In embodiments of the negative electrode of the present invention, there may be one or more first, second and third negative electrode mixture layers. That is to say, there may be multiple layers present for each of the first, second and third mixture layers. For instance, an embodiment of the present invention may include at least two layers for one or more of the first, second and third negative electrode mixture layers. These layers may be successive or alternating.

The first negative electrode mixture layer may function to increase the adhesion between the second negative electrode mixture layer containing a silicon-based negative electrode active material and the negative electrode current collector, and may serve to alleviate volumetric swelling of the silicon-based negative electrode active material. In addition, the third negative electrode mixture layer is formed on the top surface of the second negative electrode mixture layer containing a silicon-based negative electrode active material and may improve the output characteristics of a battery by ensuring the path of lithium ions, while inhibiting volumetric swelling of the silicon-based negative electrode active material fundamentally.

The first carbonaceous negative electrode active material may include carbonaceous particles having a spherical shape. These spherical shaped carbonaceous particles may have an oxidized and/or carbon-coated surface portion. Particular examples of surface treatment methods for forming an oxidized surface portion include a method for carrying out oxidation of the surface of the first carbonaceous negative electrode active material by using an oxidizing agent selected from oxygen, air, ozone, aqueous hydrogen peroxide, nitric acid, nitro compounds or mixtures thereof under the condition of a pressure of 50-400 atm and a temperature of 100-600° C. A portion or entirety of the surface of the first carbonaceous negative electrode active material may be oxidized.

The oxidized surface portion of the first carbonaceous negative electrode active material may have oxygen, nitrogen or hydrogen atoms, and thus the relatively hydrophobic carbonaceous negative electrode active material becomes hydrophilic. Thus, the contactability with the polymer binder and binding force thereto may be increased, resulting in an increase in binding force between the silicon-based negative electrode active material and the negative electrode current collector.

Particularly, the substantially hydrophobic surface of the first carbonaceous negative electrode active material, before the treatment, is converted into a hydrophilic surface after the oxidation treatment. Therefore, the binder in the electrode is bound to the hydrophilized active material surface in a larger amount, thereby increasing the binding force of the binder to the active material. On the other hand, on the hydrophobic active material surface, the binder is not attached to the active material surface but a relatively large amount of dead binder agglomerated and floating between binder particles is present, resulting in a significant decrease in the binding force to the active material. In other words, the negative electrode according to an embodiment of the present disclosure may have an increased amount of binder attached to the surface of the negative electrode active material, and the surface functional groups of the active material may increase the binding force between the binder and the active material surface. As a result, the binding force between the negative electrode mixture layer and the current collector may also be increased.

The contents of oxygen, nitrogen and hydrogen atoms on the oxidized surface portion may be determined by elemental analysis, particularly by using an oxygen nitrogen hydrogen determinator or temperature-programmed oxidation coupled with mass spectrometry detection (TPO-MS) system, but is not limited thereto.

The oxygen atom content of the oxidized surface portion may be 500-3,000 mg/kg, particularly 1,000-2,300 mg/kg, and more particularly 1,700-2,000 mg/kg, the nitrogen atom content may be 100-2,000 mg/kg, particularly 500-1,500 mg/kg, and more particularly 900-1,100 mg/kg, and the hydrogen atom content may be 10-100 mg/kg, particularly 30-80 mg/kg, and more particularly 40-70 mg/kg. Herein, the content of each of oxygen, nitrogen and hydrogen atoms refers to the weight of oxygen, nitrogen and hydrogen atoms based on the total weight of the oxidized active material.

In addition, the first carbonaceous negative electrode active material may be provided with a carbon-coated surface portion, and the carbon may be amorphous carbon. Herein, the carbon coating may have a thickness of 50-200 nm. A portion or the entirety of the surface of the first carbonaceous negative electrode active material may have the carbon coating thereon.

When the first carbonaceous negative electrode active material is provided with the carbon-coated surface portion, the first carbonaceous negative electrode active material may have improved hardness so that it may be less pressed in a pressing step when forming the negative electrode mixture layer. In addition, the first carbonaceous negative electrode active material may be stacked in a flake shape, and thus it is possible to ensure a path for transporting lithium ions rapidly. A secondary battery using the negative electrode provided with the first carbonaceous negative electrode active material having such a carbon-coated surface portion may realize an excellent effect of improving electrical characteristics, such as output characteristics and life characteristics.

In addition, the first carbonaceous negative electrode active material may have a spherical shape and particularly has a spherical shape with a sphericity of 0.90-0.99, more particularly 0.92-0.97.

The sphericity may be calculated by using a particle shape analyzer (QICPIC-LIXELL, Sympatec GmbH). Particularly, the length of longer axis (l) and that of shorter axis (w) are determined to calculate the sphericity (l/x). A perfect sphere has a sphericity of 1. As the sphericity value approaches 1, the material has a shape similar to a perfect sphere.

When the sphericity of the first carbonaceous negative electrode active material satisfies the above-defined range of 0.90-0.99, a larger amount of binder is distributed uniformly on the active material surface, and thus the contact area between the active material particles and binder particles is increased during the pressing of an electrode. As a result, it is possible to improve the adhesion between the active material particles and binder particles and the adhesion between the active material particles and the current collector.

In another embodiment, the first carbonaceous negative electrode active material particles may have both an oxidized surface portion and a carbon-coated surface portion. For instance, a first portion of the surface of the first carbonaceous negative electrode active material may be oxidized and a second portion of the first carbonaceous negative electrode active material may have a carbon coating thereon.

Meanwhile, the second carbonaceous negative electrode active material may have a flake-like shape. Particularly, the second carbonaceous negative electrode active material includes secondary particles formed by aggregation of primary particles, and may have a flake shape, i.e., sheet or sheet-like shape, and a sphericity of 0.70-0.89, particularly 0.75-0.87.

When the sphericity of the second carbonaceous negative electrode active material satisfies the above-defined range of 0.70-0.89, it is significantly out of a spherical shape and has increased orientability toward the c-axis. Thus, the second carbonaceous negative electrode active material may provide the electrode mixture layer with distribution of large pores, thereby significantly improving lithium ion input/output characteristics of the third negative electrode mixture layer facing the positive electrode.

In addition, the second carbonaceous negative electrode active material may have a carbon-coated surface portion and the carbon may be amorphous carbon. Herein, the carbon coating may have a thickness of 50-200 nm. A portion or entirety of the surface of the second carbonaceous negative electrode active material may have the carbon coating thereon.

When the second carbonaceous negative electrode active material is provided with the carbon-coated surface portion, the second carbonaceous negative electrode active material may have improved hardness so that it may be less pressed in a pressing step when forming the negative electrode mixture layer. In addition, the second carbonaceous negative electrode active material may be stacked in a flake shape, and thus it is possible to ensure a path for transporting lithium ions rapidly. Since the third negative electrode mixture layer containing the second carbonaceous negative electrode active material may be present on the topmost surface, i.e., the surface facing the positive electrode, lithium ions can be intercalated into the negative electrode rapidly and can be deintercalated toward the positive electrode, resulting in significant improvement of the output characteristics of a battery.

Particularly, the third negative electrode mixture layer may include the second carbonaceous negative electrode active material having a secondary particle shape. Thus, it may have a structure which allows lithium ion intercalation/deintercalation with ease as compared to a primary particle shape. In addition, the sphericity characteristics and carbon coating of the second carbonaceous negative electrode active material may provide a high orientation degree in the direction of c-axis, thereby facilitating lithium ion intercalation/deintercalation. Particularly, when the second carbonaceous negative electrode active material is coated with amorphous carbon, it may be possible to further facilitate lithium intercalation/deintercalation by virtue of the amorphous surface structure of the negative electrode active material, resulting in significant improvement of output characteristics. The third negative electrode mixture layer has an advantage of high output characteristics but may show a disadvantage of low adhesion to the electrode current collector. For this, the third negative electrode mixture layer is preferably disposed so that it does not directly face the electrode current collector.

The particles of the first carbonaceous negative electrode active material may have an average particle diameter of 3-25 μm, particularly 5-20 μm, and more particularly 10-18 μm. The particles of the second carbonaceous negative electrode active material may have an average particle diameter of 10-30 μm, particularly 12-25 μm, and more particularly 15-22 μm.

When the average particle diameter of the particles of the first carbonaceous negative electrode active material satisfies the above-defined range of 3-25 μm, it is possible to improve the adhesion of an electrode. When the average particle diameter of the particles of the second carbonaceous negative electrode active material satisfies the above-defined range of 10-30 μm, it is possible to improve output characteristics.

Herein, the above-mentioned effects may be enhanced, when the first carbonaceous negative electrode active material and the second carbonaceous negative electrode active material satisfy one or more of the above-defined average particle diameter ranges, particle shape, oxidation treatment, carbon coating and sphericity of active materials.

In addition, the first carbonaceous negative electrode active material may have a tap density of 0.98-1.20 g/cc, particularly 1.00-1.10 g/cc, and the second carbonaceous negative electrode active material may have a tap density of 0.70-0.97 g/cc, particularly 0.80-0.95 g/cc.

When the first carbonaceous negative electrode active material satisfies the above-defined tap density range of 0.98-1.20 g/cc, it may be possible to improve the adhesion of an electrode. When the second carbonaceous negative electrode active material satisfies the above-defined tap density range of 0.70-0.97 g/cc, it may be possible to improve output characteristics. Herein, the above-mentioned effects may be enhanced, when the first carbonaceous negative electrode active material and the second carbonaceous negative electrode active material satisfy one or more of the above-defined tap density ranges, particle shape, oxidation treatment, carbon coating and sphericity of active materials.

In addition, the first carbonaceous negative electrode active material may have a specific surface area of 1.5-4.5 $m^2/g$, particularly 2.5-3.5 $m^2/g$, and the second carbonaceous negative electrode active material may have a specific surface area of 0.4-1.5 $m^2/g$, particularly 0.7-1.2 $m^2/g$ When the first carbonaceous negative electrode active material satisfies the above-defined specific surface area range of 1.5-4.5 $m^2/g$, it may be possible to improve the adhesion of an electrode. When the second carbonaceous negative electrode active material satisfies the above-defined specific surface area range of 0.4-1.5 $m^2/g$, it may be possible to improve output characteristics.

In addition, the first carbonaceous negative electrode active material may have a crystal size of 90-120 nm, particularly 91-110 nm, and the second carbonaceous negative electrode active material may have a crystal size of 60-90 nm, particularly 60-85 nm, more particularly 65-80 nm.

When the first carbonaceous negative electrode active material satisfies the above-defined crystal size range of 90-120 nm, it may be possible to improve the adhesion of an electrode. When the second carbonaceous negative electrode active material satisfies the above-defined crystal size range of 60-90 nm, it may be possible to improve output characteristics.

The first negative electrode mixture layer may have a porosity corresponding to 0.85-0.95 times, particularly 0.90-0.92 times of the porosity of the third negative electrode mixture layer. When the first negative electrode mixture layer satisfies the above-defined ratio of porosity of 0.85-0.95 times, it may be possible to provide the first negative electrode mixture layer facing the current collector with high density, thereby improving the adhesion to the current collector, and improving the lithium ion input/output characteristics of the third negative electrode mixture layer facing the positive electrode layer.

According to an embodiment of the present disclosure, there is no particular limitation in the first carbonaceous negative electrode active material and the second carbonaceous negative electrode active material, as long as they satisfy the above-described conditions. According to a preferred embodiment, the first carbonaceous negative electrode active material may be spherical natural graphite and the second carbonaceous negative electrode active material may be flake-like artificial graphite.

In general, in the case of natural graphite, since graphitization is accomplished sufficiently to the particle surface layer, electrostatic repulsion between particles is strong and slidability is significantly high. Therefore, it may show excellent pressing characteristics.

Meanwhile, as mentioned above, a problem of orientation toward the surface direction of the current collector occurs after pressing, and such orientation largely occurs particularly in sheet-like natural graphite. Thus, in order to prevent the problem, it may be advantageous to use spherical natural graphite obtained by sphericalization of sheet-like natural graphite as the first carbonaceous negative electrode active material.

In general, in the case of artificial graphite, the particle surface layer is present substantially in an amorphous state not subjected to graphitization. The particle surface layer in its substantially amorphous state shows low electrostatic repulsion between particles unique to the graphitic layered structure, and thus shows insufficient slidability. Therefore, pressing is not carried out smoothly and a change in shape of artificial graphite is small, and thus orientation of artificial graphite is not carried out smoothly.

Artificial graphite used as the second carbonaceous negative electrode active material may include secondary particles formed by aggregation of primary particles. The primary particles of artificial graphite may be obtained by heat treating at least one selected from the group consisting of needle cokes, mosaic cokes and coal tar pitch.

There is no particular limitation in the silicon-based negative electrode active material, as long as it includes silicon and can be used as a negative electrode active material. Particular examples of the silicon-based negative electrode active material include at least one selected from the group consisting of silicon and silicon oxides ($SiO_x$, $0<x<2$).

In the negative electrode according to an embodiment of the present disclosure, $SiO_x(0<x<2)$ may be silicon monoxide. Currently used silicon particles undergo a very complicated crystalline change in the reaction including electrochemical absorption and storage/release of lithium atoms. As the reaction including electrochemical absorption and storage/release of lithium atoms proceeds, the composition and crystal structure of silicon particles are changed into Si (crystal structure: Fd3m), LiSi (crystal structure: I41/a), $Li_2Si$ (crystal structure: C2/m), $Li_7Si_2$ (Pbam), $Li_{22}Si_5$ (F23), or the like. In addition, the volume of silicon particles is expanded to about 4 times according to such a complicated change in crystal structure. Therefore, when repeating charge/discharge cycles, silicon particles are broken and bonds between lithium atoms and silicon particles are formed. Thus, the lithium atom intercalation sites present in silicon particles initially are damaged, resulting in significant degradation of cycle life.

In the negative electrode according to an embodiment of the present disclosure, the negative electrode mixture layer including a silicon-based negative electrode active material, such as $SiO_x(0<x<2)$, is present at the center, and the negative electrode mixture layers present on the top surface and bottom surface thereof may accomplish one or more of inhibiting non-uniform volumetric swelling of the silicon-based negative electrode active material, improving the adhesion to the current collector and ensuring a lithium ion path. As a result, even when the second negative electrode mixture layer including a silicon-based negative electrode active material undergoes a decrease or a change in thickness, it may be possible to prevent separation from the current collector/separator, and thus to improve life characteristics.

In addition, the silicon-based negative electrode active material according to an embodiment of the present disclosure may have an average particle diameter ($D_{50}$) of 0.01-20 μm, particularly 0.01-10 μm. When the average particle diameter of the silicon-based negative electrode active material satisfies the above-defined range of 0.01-20 μm, the silicon-based negative electrode active material may be dispersed in slurry with ease. In addition, it may be possible to solve the problem of degradation of bindability among particles caused by severe swelling of particles after lithium ion intercalation during repeated charge/discharge cycles.

According to the present disclosure, the average particle diameter is defined as the particle diameter at a level of 50% in the particle size distribution. For example, the average particle diameter ($D_{50}$) of the particles according to an embodiment of the present disclosure may be determined by using a laser diffraction method. The laser diffraction method allows determination of particle diameter from a submicron region to several millimeters and can provide results with high reproducibility and high resolution.

As used herein, the term 'primary particles' means original particles when another type of particles is formed from one type of particles. A plurality of such primary particles may be aggregated, bound or assembled to form secondary particles.

As used herein, the term 'secondary particles' means physically discernable large particles formed by, for instance, aggregation, binding or assemblage of individual primary particles.

The polymer binder in the first polymer binder, the second polymer binder and the third polymer binder is an ingredient which may assist binding between the negative electrode active material and the conductive material and binding to the current collector. Each polymer binder independently includes various types of binder polymers, such as polyvinylidene fluoride-co-hexafluoropropylene, polyvinylidene fluoride, polyacrylonitrile, polymethyl methacrylate, styrene-butadiene rubber, carboxymethyl cellulose, or the like. Each of the first polymer binder, the second polymer binder and the third polymer binder may be present in an amount of 1-10 parts by weight, particularly 1.2-8.7 parts by weight, and more particularly 1.5-8 parts by weight, based on 100 parts by weight of the negative electrode active material contained in each electrode mixture layer.

The conductive material in the first conductive material, the second conductive material and the third conductive material has conductivity while not causing any chemical change in the corresponding battery. Particular examples of the conductive material include: graphite, such as natural graphite or artificial graphite; carbon black, such as carbon black, acetylene black, ketjen black, channel black, furnace black, lamp black or thermal black; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive polymer, such as polyphenylene derivatives.

Each of the first conductive material, the second conductive material and the third conductive material may be present in an amount of 0.1-20 parts by weight, particularly 0.5-15 parts by weight, and more particularly 1-10 parts by weight, based on 100 parts by weight of the negative electrode active material of the negative electrode mixture layer including each conductive material.

The negative electrode according to an embodiment of the present disclosure may be obtained by applying each negative electrode mixture composition containing the negative electrode active material, binder polymer and conductive material to the layer underneath, for instance starting with applying the first negative electrode mixture composition to a negative electrode current collector, followed by drying and pressing. Subsequent layers, such as the second negative electrode mixture layer and the third negative electrode mixture layer may be applied in a similar fashion. The negative electrode mixture compositions may be prepared by further incorporating a dispersing agent thereto depending on the particular application method.

In general, the negative electrode current collector is formed to have a thickness of 3-500 µm. The negative electrode current collector is not particularly limited, as long as it causes no chemical change in the corresponding battery and has conductivity. Particular examples of the negative electrode current collector may include copper; stainless steel; aluminum; nickel; titanium; baked carbon; copper or stainless steel surface-treated with carbon, nickel, titanium or silver; aluminum-cadmium alloy; or the like. It is possible to increase the adhesion of a negative electrode active material by forming fine surface irregularities on the surface of a current collector, as is true with respect to the positive electrode current collector as discussed below. The negative electrode current collector may have various shapes, such as a film, sheet, foil, net, porous body, foam and a non-woven fabric body.

In addition, the combined negative electrode mixture layers according to an embodiment of the present disclosure may have a total thickness of 50-300 µm, particularly 80-120 µm. Particularly, the first negative electrode mixture layer may have a thickness of 10-145 µm, particularly 30-60 µm, the second negative electrode mixture layer may have a thickness of 10-30 µm, particularly 20-25 µm, and the third negative electrode mixture layer may have a thickness of 10-145 µm, particularly 30-60 µm.

Further, the negative electrode mixture composition may further include a filler. The filler is an ingredient inhibiting swelling of the negative electrode and is used optionally. The filler is not particularly limited, as long as it causes no chemical change in the corresponding battery and is a fibrous material. Particular examples of the filler include olefinic polymers, such as polyethylene or polypropylene; and fibrous materials, such as glass fibers or carbon fibers.

The dispersing agent is not particularly limited, but particular examples thereof include isopropyl alcohol, N-methyl pyrrolidone (NMP), acetone, or the like.

The application may be carried out by the methods known to those skilled in the art. For example, the application may be carried out by distributing the first negative electrode active material on the top surface at one side of the negative electrode current collector, and then dispersing it homogeneously with a doctor blade, etc. In addition to this, the application may be carried out through die casting, comma coating, screen printing, or the like. Other negative electrode mixture layers may be similarly applied.

The drying is not particularly limited but may be carried out in a vacuum oven at 50-200° C. within 1 day.

Referring to FIG. 2 and FIG. 3, it can be seen that the negative electrode for a lithium secondary battery according to an embodiment of the present disclosure (FIG. 3) is inhibited from non-uniform swelling and separation during charge, as compared to the conventional negative electrode for a lithium secondary battery (FIG. 2).

As shown in FIG. 2, the conventional negative electrode 200 has a negative electrode mixture layer 220 including a silicon-based negative electrode active material alone on a negative electrode current collector 210. When a battery using the negative electrode is charged, the mixture layer itself causes non-uniform swelling due to the large volumetric swelling (illustrated by highlighting section "A" in FIG. 2) of the silicon-based negative electrode active material, and thus the negative electrode mixture layer 220 is separated from the current collector 210.

Meanwhile, referring to FIG. 3, the negative electrode 300 for a lithium secondary battery according to an embodiment of the present disclosure is provided with a first negative electrode mixture layer 320 including a first carbonaceous negative electrode active material, a second negative electrode mixture layer 330 including a silicon-based negative electrode active material, and a third negative electrode mixture layer 340 including a second carbonaceous negative electrode active material, successively on the top surface of a current collector 310. When applying the negative electrode 300 to a battery, even though the mixture layer of the silicon-based negative electrode active material is present, like the conventional electrode, it is possible to solve the problems of non-uniform volumetric swelling (illustrated by highlighting section "B" in FIG. 3) of the silicon-based negative electrode active material and separation in the electrode, since the negative electrode mixture layers each including a different type of carbonaceous negative electrode active material as described above are present on the bottom surface and the top surface so that they may face the negative current collector and the positive electrode, respectively.

In another aspect, there is provided a lithium secondary battery including the above-described negative electrode for a secondary battery, a positive electrode, and a separator interposed between the negative electrode and the positive electrode.

The positive electrode includes a positive electrode current collector and a positive electrode mixture layer formed on at least one surface of the positive electrode current collector. The positive electrode mixture layer may include a positive electrode active material, a conductive material and a polymer binder.

The positive electrode active material may be a lithium-containing oxide, preferably a lithium-containing transition metal oxide. Particular examples of the positive electrode active material may include any one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\le y<1$), $Li_xNi_{1-y}Mn_yO_2$ ($0.5<x<1.3$, $0\le y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$) and $Li_xFePO_4$ ($0.5<x<1.3$), or a combination of two or more of them. In addition, the lithium-containing transition metal oxide may be coated with a metal, such as aluminum, or metal oxide. Further, besides such lithium-containing transition metal oxides, sulfides, selenides and halides may be used.

The positive electrode current collector is not particularly limited, as long as it causes no chemical change in the corresponding battery and has high conductivity. Particular examples of the positive electrode current collector may include stainless steel; aluminum; nickel; titanium; baked carbon; copper; aluminum or stainless steel surface-treated with carbon, nickel, titanium or silver; or the like. It is possible to increase the adhesion of a positive electrode active material by forming fine surface irregularities on the surface of a current collector. The positive electrode current collector may have various shapes, such as a film, sheet, foil, net, porous body, foam and a non-woven fabric body.

The separator may be a porous polymer substrate, and the pore size and porosity of the porous polymer substrate is not particularly limited but may be about 0.01-50 µm and about 10-95%, respectively.

In addition, the porous polymer substrate may include a porous coating layer containing inorganic particles and a polymer binder on at least one surface of the porous substrate in order to improve the mechanical strength and to inhibit a short-circuit between the positive electrode and the negative electrode.

Non-limiting examples of the separator include a film, non-woven fabric or woven-fabric made of at least one polymer or a mixture of two or more polymers selected from the group consisting of polyethylene, polypropylene, polyethylene terephthalate, polybutylene terephthalate, polyester, polyacetal, polyamide, polycarbonate, polyimide, polyetherether ketone, polyarylether ketone, polyetherimide, polyamideimide, polybenzimidazole, polyether sulfone, polyphenylene oxide, cyclic olefin copolymer, polyphenylene sulfide and polyethylene naphthalate.

In addition, the secondary battery further includes an electrolyte. The electrolyte may include a currently used organic solvent and lithium salt, but is not limited thereto.

Particular examples of the anion of the lithium salt may be at least one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxy ethane, diethoxy ethane, vinylene carbonate, sulfolane, γ-butyrolactone, propylene sulfite and tetrahydrofuran.

Particularly, ethylene carbonate and propylene carbonate, which are cyclic carbonates among the carbonate organic solvents, have a high dielectric constant and dissociate the lithium salt in an electrolyte well, therefore they can be preferably used. In addition, when using such cyclic carbonates in combination with low-viscosity low-dielectric constant linear carbonates, such as dimethyl carbonate and diethyl carbonate, at an adequate ratio, it is possible to prepare an electrolyte solution having a high electroconductivity, therefore such a combined use is more preferable.

In addition, the electrolyte may further include pyridine, triethyl phosphite, triethanolamine, cyclic ethers, ethylene diamine, n-glyme, triamide hexaphosphate, nitrobenzene derivatives, sulfur, quinone imine dyes, N-substituted oxazolidinone, N,N-substituted imidazolidine, ethylene glycol dialkyl ether, ammonium salt, pyrrole, 2-methoxyethaol and aluminum trichloride in order to improve the charge/discharge characteristics, flame resistance, or the like. Optionally, the electrolyte may further include a halogen-containing solvent, such as carbon tetrachloride or trifluoroethylene, in order to impart non-combustibility. The electrolyte may further include carbon dioxide gas in order to improve the high-temperature storage characteristics. In addition, the electrolyte may further include fluoro-ethylene carbonate (FEC), propene sultone (PRS), fluoro-propylene carbonate (FPC), or the like.

The lithium secondary battery according to an embodiment of the present disclosure may be obtained by interposing the separator between the positive electrode and the negative electrode to form an electrode assembly, introducing the electrode assembly to a cylindrical battery casing or prismatic battery casing, and then injecting the electrolyte thereto. Otherwise, the lithium secondary battery may be obtained by stacking the electrode assemblies, impregnating the stack with the electrolyte, and introducing the resultant product to a battery casing, followed by sealing.

The battery casing used herein may be one used conventionally in the art. There is not any particular limitation in appearance of the battery depending on use. For example, the battery may be a cylindrical, prismatic, pouch type or coin type battery.

The lithium secondary battery according to the present disclosure may be used for a battery cell used as a power source for a compact device, and may be used preferably as a unit battery for a medium- or large-size battery module including a plurality of battery cells. Particular examples of such medium- or large-size device include electric vehicles, hybrid electric vehicles, plug-in hybrid electric vehicles, power storage systems, or the like, but are not limited thereto.

MODE FOR DISCLOSURE

Hereinafter, the present disclosure will be explained in more detail with reference to preferred embodiments. However, the following embodiments are for illustrative purposes only and the scope of the present disclosure is not limited thereto.

Example 1-1

First, spherical natural graphite having an average particle diameter of 16 µm, a sphericity of 0.96, a tap density of 1.1 g/cc, a specific surface area of 3.0 $m^2/g$ and a crystal size of 95 nm and subjected to oxidation treatment on the surface thereof to an oxygen content of 1,800 mg/kg, as a first carbonaceous negative electrode active material, Denka black as a conductive material, styrene butadiene rubber (SBR) as an aqueous binder and carboxymethyl cellulose (CMC) were introduced to distilled water at a weight ratio of 95:1.5:2:1.5 and then mixed to obtain a first negative electrode mixture composition. The first negative electrode mixture composition was coated on copper foil, followed by pressing and drying, to form a first negative electrode mixture layer having a thickness of 40 µm and a porosity of 28%.

Next, silicon oxide (SiO) having an average particle diameter of 6 µm as a silicon-based negative electrode active material, Denka black as a conductive material, styrene butadiene rubber (SBR) as an aqueous binder and carboxymethyl cellulose (CMC) were introduced to distilled water at a weight ratio of 95:1.5:2:1.5 and then mixed to obtain a second negative electrode mixture composition. The second negative electrode mixture composition was coated on the first negative electrode mixture layer, followed by pressing and drying, to form a second negative electrode mixture layer having a thickness of 20 µm and a porosity of 40%.

Then, sheet-like artificial graphite having an average particle diameter of 18 µm, a sphericity of 0.86, a tap density of 0.89 g/cc, a specific surface area of 1.1 $m^2/g$ and a crystal size of 75 nm and subjected to carbon coating treatment on the surface thereof (amorphous carbon coating, thickness 125 nm), as a second carbonaceous negative electrode active material, Denka black as a conductive material, styrene butadiene rubber (SBR) as an aqueous binder and carboxymethyl cellulose (CMC) were introduced to distilled water at a weight ratio of 95:1.5:2:1.5 and then mixed to obtain a third negative electrode mixture composition. The third negative electrode mixture composition was coated on the second negative electrode mixture layer, followed by pressing and drying, to form a third negative electrode mixture layer having a thickness of 40 μm and a porosity of 30%. Finally, a negative electrode provided with three negative electrode mixture layers was obtained.

Example 2-1

First, spherical natural graphite having an average particle diameter of 16 μm, a sphericity of 0.96, a tap density of 1.1 g/cc, a specific surface area of 2.5 m$^2$/g and a crystal size of 95 nm and subjected to carbon coating treatment on the surface thereof (amorphous carbon coating, thickness 125 nm), as a first carbonaceous negative electrode active material, Denka black as a conductive material, styrene butadiene rubber (SBR) as an aqueous binder and carboxymethyl cellulose (CMC) were introduced to distilled water at a weight ratio of 95:1.5:2:1.5 and then mixed to obtain a first negative electrode mixture composition. The first negative electrode mixture composition was coated on copper foil, followed by pressing and drying, to form a first negative electrode mixture layer having a thickness of 40 μm and a porosity of 28%.

Then, the second negative electrode mixture layer and the third negative electrode mixture layer were formed on the resultant first negative electrode mixture layer in the same manner as described in Example 1-1 to obtain a negative electrode provided with three negative electrode mixture layers.

Comparative Example 1-1

Silicon oxide (SiO) having an average particle diameter of 6 μm as a negative electrode active material, Denka black as a conductive material, styrene butadiene rubber (SBR) as an aqueous binder and carboxymethyl cellulose (CMC) were introduced to distilled water at a weight ratio of 95:1.5:2:1.5 and then mixed to obtain a negative electrode mixture composition. The negative electrode mixture composition was coated on copper foil, followed by pressing and drying, to obtain a negative electrode having a thickness of 20 μm and a porosity of 40%.

Comparative Example 2-1

A negative electrode provided with three negative electrode mixture layers was obtained in the same manner as described in Example 1, except that spherical natural graphite having an average particle diameter of 16 μm, a sphericity of 0.96, a tap density of 1.1 g/cc, a specific surface area of 3.0 m$^2$/g and a crystal size of 95 nm and subjected to oxidation treatment on the surface thereof to an oxygen content of 1,800 mg/kg was used as the second carbonaceous negative electrode active material, like the first carbonaceous negative electrode active material.

Comparative Example 3-1

A negative electrode provided with three negative electrode mixture layers was obtained in the same manner as described in Example 1, except that sheet-like artificial graphite having an average particle diameter of 18 μm, a sphericity of 0.86, a tap density of 0.89 g/cc, a specific surface area of 1.1 m$^2$/g and a crystal size of 75 nm and subjected to carbon coating treatment on the surface thereof (amorphous carbon coating, thickness 125 nm) was used as the first carbonaceous negative electrode active material, like the second carbonaceous negative electrode active material.

Comparative Example 4-1

A negative electrode provided with three negative electrode mixture layers was obtained in the same manner as described in Example 1, except that sheet-like artificial graphite having an average particle diameter of 18 μm, a sphericity of 0.86, a tap density of 0.89 g/cc, a specific surface area of 1.1 m$^2$/g and a crystal size of 75 nm and subjected to carbon coating treatment on the surface thereof (amorphous carbon coating, thickness 125 nm) was used as the first carbonaceous negative electrode active material, and spherical natural graphite having an average particle diameter of 16 μm, a sphericity of 0.96, a tap density of 1.1 g/cc, a specific surface area of 3.0 m$^2$/g and a crystal size of 95 nm and subjected to oxidation treatment on the surface thereof to an oxygen content of 1,800 mg/kg was used as the second carbonaceous negative electrode active material (i.e. the negative electrode active material of the first negative electrode mixture layer is changed with that of the third negative electrode mixture layer).

Comparative Example 5-1

First, spherical natural graphite having an average particle diameter of 16 μm, a sphericity of 0.80, a tap density of 1.1 g/cc, a specific surface area of 3.7 m$^2$/g and a crystal size of 95 nm and subjected to oxidation treatment on the surface thereof to an oxygen content of 1,800 mg/kg, as a first carbonaceous negative electrode active material, Denka black as a conductive material, styrene butadiene rubber (SBR) as an aqueous binder and carboxymethyl cellulose (CMC) were introduced to distilled water at a weight ratio of 95:1.5:2:1.5 and then mixed to obtain a first negative electrode mixture composition. The first negative electrode mixture composition was coated on copper foil, followed by pressing and drying, to form a first negative electrode mixture layer having a thickness of 40 μm and a porosity of 28%.

Then, the second negative electrode mixture layer and the third negative electrode mixture layer were formed on the resultant first negative electrode mixture layer in the same manner as described in Example 1-1 to obtain a negative electrode provided with three negative electrode mixture layers.

Comparative Example 6-1

First, spherical natural graphite having an average particle diameter of 16 μm, a sphericity of 0.80, a tap density of 1.1 g/cc, a specific surface area of 3.2 m$^2$/g and a crystal size of 95 nm and subjected to carbon coating treatment on the surface thereof (amorphous carbon coating, thickness 125 nm), as a first carbonaceous negative electrode active material, Denka black as a conductive material, styrene butadiene rubber (SBR) as an aqueous binder and carboxymethyl cellulose (CMC) were introduced to distilled water at a weight ratio of 95:1.5:2:1.5 and then mixed to obtain a first negative electrode mixture composition. The first negative electrode mixture composition was coated on copper foil, followed by pressing and drying, to form a first negative electrode mixture layer having a thickness of 40 μm and a porosity of 28%.

Then, the second negative electrode mixture layer and the third negative electrode mixture layer were formed on the resultant first negative electrode mixture layer in the same manner as described in Example 1-1 to obtain a negative electrode provided with three negative electrode mixture layers.

Comparative Example 7-1

First, spherical natural graphite having an average particle diameter of 16 μm, a sphericity of 0.96, a tap density of 1.1 g/cc, a specific surface area of 3.0 m$^2$/g and a crystal size of 95 nm and subjected to oxidation treatment on the surface thereof to an oxygen content of 1,800 mg/kg, as a first carbonaceous negative electrode active material, Denka black as a conductive material, styrene butadiene rubber (SBR) as an aqueous binder and carboxymethyl cellulose (CMC) were introduced to distilled water at a weight ratio of 95:1.5:2:1.5 and then mixed to obtain a first negative electrode mixture composition. The first negative electrode mixture composition was coated on copper foil, followed by pressing and drying, to form a first negative electrode mixture layer having a thickness of 40 μm and a porosity of 28%.

Next, silicon oxide (SiO) having an average particle diameter of 6 μm as a silicon-based negative electrode active material, Denka black as a conductive material, styrene butadiene rubber (SBR) as an aqueous binder and carboxymethyl cellulose (CMC) were introduced to distilled water at a weight ratio of 95:1.5:2:1.5 and then mixed to obtain a second negative electrode mixture composition. The second negative electrode mixture composition was coated on the first negative electrode mixture layer, followed by pressing and drying, to form a second negative electrode mixture layer having a thickness of 20 μm and a porosity of 40%.

Then, sheet-like artificial graphite having an average particle diameter of 18 μm, a sphericity of 0.86, a tap density of 0.89 g/cc, a specific surface area of 1.1 m$^2$/g and a crystal size of 75 nm and subjected to oxidation treatment on the surface thereof to an oxygen content of 1,650 mg/kg, as a second carbonaceous negative electrode active material, Denka black as a conductive material, styrene butadiene rubber (SBR) as an aqueous binder and carboxymethyl cellulose (CMC) were introduced to distilled water at a weight ratio of 95:1.5:2:1.5 and then mixed to obtain a third negative electrode mixture composition. The third negative electrode mixture composition was coated on the second negative electrode mixture layer, followed by pressing and drying, to form a third negative electrode mixture layer having a thickness of 40 μm and a porosity of 30%. Finally, a negative electrode provided with three negative electrode mixture layers was obtained.

Comparative Example 8-1

First, spherical natural graphite having an average particle diameter of 18 μm, a sphericity of 0.86, a tap density of 0.89 g/cc, a specific surface area of 1.1 m$^2$/g and a crystal size of 75 nm and subjected to oxidation treatment on the surface thereof to an oxygen content of 1,650 mg/kg, as a first carbonaceous negative electrode active material, Denka black as a conductive material, styrene butadiene rubber (SBR) as an aqueous binder and carboxymethyl cellulose (CMC) were introduced to distilled water at a weight ratio of 95:1.5:2:1.5 and then mixed to obtain a first negative electrode mixture composition. The first negative electrode mixture composition was coated on copper foil, followed by pressing and drying, to form a first negative electrode mixture layer having a thickness of 40 μm and a porosity of 30%.

Next, silicon oxide (SiO) having an average particle diameter of 6 μm as a silicon-based negative electrode active material, Denka black as a conductive material, styrene butadiene rubber (SBR) as an aqueous binder and carboxymethyl cellulose (CMC) were introduced to distilled water at a weight ratio of 95:1.5:2:1.5 and then mixed to obtain a second negative electrode mixture composition. The second negative electrode mixture composition was coated on the first negative electrode mixture layer, followed by pressing and drying, to form a second negative electrode mixture layer having a thickness of 20 μm and a porosity of 40%.

Then, spherical natural graphite having an average particle diameter of 16 μm, a sphericity of 0.96, a tap density of 1.1 g/cc, a specific surface area of 3.0 m$^2$/g and a crystal size of 95 nm and subjected to oxidation treatment on the surface thereof to an oxygen content of 1,800 mg/kg, as a second carbonaceous negative electrode active material, Denka black as a conductive material, styrene butadiene rubber (SBR) as an aqueous binder and carboxymethyl cellulose (CMC) were introduced to distilled water at a weight ratio of 95:1.5:2:1.5 and then mixed to obtain a third negative electrode mixture composition. The third negative electrode mixture composition was coated on the second negative electrode mixture layer, followed by pressing and drying, to form a third negative electrode mixture layer having a thickness of 40 μm and a porosity of 28%. Finally, a negative electrode provided with three negative electrode mixture layers was obtained.

Example 1-2

LiCoO$_2$ as a positive electrode active material, a conductive material (Denka black) and a binder (PVdF) were introduced to N-methyl pyrrolidone (NMP) at a weight ratio of 96.5:2.0:1.5 and then mixed to obtain a positive electrode mixture. The positive electrode mixture was coated on aluminum foil, followed by pressing and drying, to obtain a positive electrode.

A polyethylene membrane as a separator was interposed between the negative electrode obtained from Example 1-1 and the above-mentioned positive electrode, and an electrolyte solution containing 1 M LiPF$_6$ dissolved in a solvent containing ethylene carbonate (EC):ethyl methyl carbonate (EMC):diethyl carbonate (DEC) at a volume ratio of 3:2:5 was used in combination with 5 wt % of fluoroethylene carbonate (FEC) and 1.5 wt % of vinylene carbonate (VC) as an electrolyte solution additive, based on the total weight of the electrolyte. In this manner, a secondary battery was obtained.

Example 2-2

A secondary battery was obtained in the same manner as described in Example 1-2, except that the negative electrode according to Example 2-1 was used.

Comparative Example 1-2

A secondary battery was obtained in the same manner as described in Example 1-2, except that the negative electrode according to Comparative Example 1-1 was used.

Comparative Example 2-2

A secondary battery was obtained in the same manner as described in Example 1-2, except that the negative electrode according to Comparative Example 2-1 was used.

Comparative Example 3-2

A secondary battery was obtained in the same manner as described in Example 1-2, except that the negative electrode according to Comparative Example 3-1 was used.

Comparative Example 4-2

A secondary battery was obtained in the same manner as described in Example 1-2, except that the negative electrode according to Comparative Example 4-1 was used.

Comparative Example 5-2

A secondary battery was obtained in the same manner as described in Example 1-2, except that the negative electrode according to Comparative Example 5-1 was used.

Comparative Example 6-2

A secondary battery was obtained in the same manner as described in Example 1-2, except that the negative electrode according to Comparative Example 6-1 was used.

Comparative Example 7-2

A secondary battery was obtained in the same manner as described in Example 1-2, except that the negative electrode according to Comparative Example 7-1 was used.

Comparative Example 8-2

A secondary battery was obtained in the same manner as described in Example 1-2, except that the negative electrode according to Comparative Example 8-1 was used.

Method for Determining Sphericity

A particle shape analyzer (QICPIC-LIXELL, Sympatec GmbH) was used to measure the length of the longer axis (l) and that of the shorter axis (w) of a negative electrode active material. In this manner, it is possible to calculate the sphericity (l/w).

Method for Determining Average Particle Diameter

A laser diffraction method may be used to determine an average particle diameter. In general, the laser diffraction method can measure particle diameters from the submicron region to several millimeters and provide results with high reproducibility and high resolution.

Method for Determining Tap Density

First, 40 g of particles was introduced to a 100 mL cylinder. Then, powder packing density was determined after carrying out tapping 1000 times.

Method for Determining Specific Surface Area

A specific surface area analyzer (BELSORP mini, BEL Japan, Inc. (Japan)) was used. Specific surface area values were calculated through physical adsorption of nitrogen gas by introducing 4 g of a sample.

Method for Determining Crystal Size

To determine a crystal size (Lc), a graph of 2θ values obtained by using X-ray diffractometry (XRD) is obtained and the crystallite size (Lc (002)) in the direction of C-axis can be calculated by the Scherrer equation.

$$L_c = \frac{K\lambda}{\beta_{(2\theta)}\cos\theta}$$

K=Scherrer constant (K=0.9)
β=half-width
λ=wavelength (0.154056 nm)
θ=angle at the maximum peak

Evaluation for Adhesion of Electrode

Each of the negative electrodes according to Example 1-1, Example 2-1 and Comparative Examples 1-1 to 8-1 was evaluated for the adhesion according to the following conditions. The results are shown in the following Table 1.

The negative electrode was cut into 10 mm×150 mm and fixed on the central portion of slide glass with a size of 26 mm×76 mm. Then, the 180° peel strength was measured while the negative electrode current collector was peeled by using a Universal Testing Machine (UTM). Peel strength was measured at least 5 times and the average value was used for evaluation. The UTM instrument measuring condition was 100 mm/min, and the oxidation treatment and the carbon coating treatment can be performed simultaneously.

Evaluation for Battery Output Characteristics

Each of the secondary batteries according to Example 1-2, Example 2-2 and Comparative Examples 1-2 to 8-2 was evaluated for battery output characteristics according to the following conditions. The results are shown in the following Table 2.

The conditions were such that a 3 C-rate discharge capacity was determined and the ratio of 3 C-rate discharge capacity based on 0.1 C-rate discharge capacity was calculated to evaluate battery output characteristics.

Evaluation for Battery Life Characteristics

Each of the secondary batteries according to Example 1-2, Example 2-2 and Comparative Examples 1-2 to 8-2 was evaluated for battery life characteristics according to the following conditions. The results are shown in the following Table 2.

The conditions were such that at 25° C. each battery was charged to 4.25 V at a constant current (CC) of 0.5 C and then charged under a constant voltage (CV) condition to carry out the first charge until the charging current reached 0.05 C (cut-off current). Then, the battery was allowed to stand for 20 minutes, and then discharged to 2.5V at a constant current (CC) of 0.5 C. This was repeated for 1-50 cycles to evaluate the capacity maintenance.

TABLE 1

| | Adhesion of electrode (g/cm) |
|---|---|
| Example 1-1 | 65 |
| Example 2-1 | 59 |
| Comp. Ex. 1-1 | 5 |
| Comp. Ex. 2-1 | 21 |
| Comp. Ex. 3-1 | 66 |
| Comp. Ex. 4-1 | 20 |
| Comp. Ex. 5-1 | 29 |
| Comp. Ex. 6-1 | 24 |
| Comp. Ex. 7-1 | 65 |
| Comp. Ex. 8-1 | 29 |

TABLE 2

| | Output characteristics (%) | Life characteristics (%) |
|---|---|---|
| Example 1-2 | 87 | 88 |
| Example 2-2 | 89 | 90 |
| Comp. Ex. 1-2 | 52 | 50 |
| Comp. Ex. 2-2 | 77 | 75 |
| Comp. Ex. 3-2 | 78 | 80 |
| Comp. Ex. 4-2 | 80 | 76 |
| Comp. Ex. 5-2 | 79 | 76 |
| Comp. Ex. 6-2 | 80 | 77 |
| Comp. Ex. 7-2 | 81 | 80 |
| Comp. Ex. 8-2 | 80 | 77 |

The present disclosure has been described in detail with reference to specific examples and drawings. However, it should be understood that the present disclosure is not limited to the detailed description and specific examples, and various changes and modifications within the scope of the disclosure will become apparent to those skilled in the art from this detailed description.

What is claimed is:

1. A negative electrode for a lithium secondary battery which comprises:
   a negative electrode current collector;
   a first negative electrode mixture layer present on at least one surface of the negative electrode current collector and comprising a first carbonaceous negative electrode active material, a first polymer binder and a first conductive material;
   a second negative electrode mixture layer present on a top surface of the first negative electrode mixture layer and comprising a silicon-based negative electrode active material, a second polymer binder and a second conductive material; and
   a third negative electrode mixture layer present on a top surface of the second negative electrode mixture layer and comprising a second carbonaceous negative electrode active material, a third polymer binder and a third conductive material,
   wherein the first carbonaceous negative electrode active material comprises spherical shaped particles having a sphericity of 0.90-0.99, said spherical shaped particles comprising an oxidized surface portion and/or a carbon-coated surface portion, and
   the second carbonaceous negative electrode active material comprises flake shaped particles having a sphericity of 0.70-0.89, said flake shaped particles comprising a carbon-coated surface portion.

2. The negative electrode for a lithium secondary battery according to claim 1, wherein the spherical shaped particles of the first carbonaceous negative electrode active material have an average particle diameter ($D_{50}$) of 3-25 μm.

3. The negative electrode for a lithium secondary battery according to claim 1, wherein the flake shaped particles of the second carbonaceous negative electrode active material have a crystal size of 60-90 nm.

4. The negative electrode for a lithium secondary battery according to claim 1, wherein the spherical shaped particles of the first carbonaceous negative electrode active material have a sphericity of 0.92-0.97 and the flake shaped particles of the second carbonaceous negative electrode active material have a sphericity of 0.75-0.87.

5. The negative electrode for a lithium secondary battery according to claim 1, wherein the first negative electrode mixture layer has a porosity which is 0.85-0.95 times of a porosity of the third negative electrode mixture layer.

6. The negative electrode for a lithium secondary battery according to claim 1, wherein the first carbonaceous negative electrode active material comprises natural graphite and the second carbonaceous negative electrode active material comprises artificial graphite.

7. The negative electrode for a lithium secondary battery according to claim 1, wherein the silicon-based negative electrode active material comprises at least one selected from the group consisting of silicon and silicon oxides, wherein said silicon oxides are represented by $SiO_x$, wherein $0<x<2$.

8. The negative electrode for a lithium secondary battery according to claim 1, wherein each of the first polymer binder, the second polymer binder and the third polymer binder is independently at least one selected from the group consisting of polyvinylidene fluoride-co-hexafluoropropylene, polyvinylidene fluoride, polyacrylonitrile, polymethyl methacrylate, styrene-butadiene rubber and carboxymethyl cellulose.

9. The negative electrode for a lithium secondary battery according to claim 1, wherein each of the first conductive material, the second conductive material and the third conductive material is independently at least one selected from the group consisting of graphite, carbon black, conductive fibers, metal powder, conductive whisker, conductive metal oxide and a conductive polymer.

10. A lithium secondary battery comprising:
    a positive electrode;
    the negative electrode according to claim 1; and
    a separator interposed between the positive electrode and the negative electrode.

* * * * *